United States Patent
Minerich et al.

(10) Patent No.: US 6,799,467 B2
(45) Date of Patent: Oct. 5, 2004

(54) PRESSURE INDICATOR

(75) Inventors: Phillip L. Minerich, Austin, MN (US); Marie A. Guion, St. Paul, MN (US); Andrew D. Bicek, Big Lake, MN (US); Thomas B. Priebe, Shakopee, MN (US); Daniel T. Wolters, Red Wing, MN (US); Paul C. Luna, Minneapolis, MN (US)

(73) Assignee: Hormel Foods, LLC, Austin, MN (US)

( * ) Notice: Subject to any disclaimer, the term of this patent is extended or adjusted under 35 U.S.C. 154(b) by 0 days.

(21) Appl. No.: 10/361,809

(22) Filed: Feb. 7, 2003

(65) Prior Publication Data

US 2003/0226411 A1 Dec. 11, 2003

Related U.S. Application Data

(60) Provisional application No. 60/355,625, filed on Feb. 8, 2002.

(51) Int. Cl.[7] .................................................. G01L 7/00
(52) U.S. Cl. .............................................. 73/700; 73/37
(58) Field of Search ........................... 73/700, 37, 714, 73/866.4, 866

(56) References Cited

U.S. PATENT DOCUMENTS

| | | | |
|---|---|---|---|
| 3,767,371 A | * 10/1973 | Wentorf et al. ............... 51/307 |
| 4,289,503 A | * 9/1981 | Corrigan ....................... 51/307 |
| 4,582,682 A | 4/1986 | Betz et al. ...................... 419/68 |
| 4,599,215 A | 7/1986 | Smarsly et al. ................ 419/42 |
| 4,604,252 A | 8/1986 | Stigler ......................... 264/120 |
| 4,612,163 A | 9/1986 | Nishio et al. .................. 419/68 |
| 4,673,414 A | * 6/1987 | Lavens et al. ................ 51/293 |
| 4,715,231 A | 12/1987 | Lee, II et al. ................. 73/709 |
| 5,032,352 A | 7/1991 | Meeks et al. ................... 419/8 |
| 5,227,576 A | 7/1993 | Howard ......................... 86/1.1 |
| 5,244,623 A | 9/1993 | King .......................... 264/510 |
| 5,586,783 A | 12/1996 | Adam et al. |
| 5,792,403 A | 8/1998 | Massa et al. ................. 264/122 |
| 5,972,284 A | 10/1999 | Lindsten et al. ............... 419/2 |
| 6,328,898 B1 | 12/2001 | Akiyama et al. |
| 2003/0034591 A1 | * 2/2003 | Vagarali et al. ............. 264/681 |

* cited by examiner

Primary Examiner—Hezron Williams
Assistant Examiner—Nashmiya Fayyaz
(74) Attorney, Agent, or Firm—IPLM Group, P.A.

(57) ABSTRACT

Pressure is measured inside of a high pressure vehicle. A substance is compressed at a first pressure to create a preform having a first density. The preform is placed inside of a high pressure vessel and subjected to a second pressure, greater than the first pressure. The preform therefore changes in density to a second density, greater than the first density, whereby the second pressure can be determined. The method may also be used in determining the pressure inside of a food product during food processing and a high pressure vessel.

16 Claims, 5 Drawing Sheets

Copper tablet pre-formed at 156 MPa pressure before and after HHP processing for 10-minutes at 87,000 psi (600 MPa).

Heckel Plot for copper tablets performed at 156 and 234 MPa and subsequently HHP processed at 400 and 600 MPa ($p<0.002$).

Heckel Plot for copper tablets pre-formed at 156 MPa and subsequently HHP processed at three different temperatures between 400-600 MPa (p>0.29).

Heckel Plot for copper pre-forms HHP processed between 400-600 MPa for 1, 5 or 10 minutes (p<0.012).

Heckel Plot comparing indicators HHP processed between 400-600 MPa located in the pressure medium (control) and at the center of two types of hams (ham and DC ham) ($p<0.017$).

Copper tablet pre-formed at 156 MPa pressure before and after HHP processing for 10-minutes at 87,000 psi (600 MPa).

PRESSURE INDICATOR

This application claims benefit of provisional application Ser. No. 60/355,625 filed Feb. 8, 2002, entitled "DEVELOPMENT OF A PRESSURE INDICATOR FOR HIGH HYDROSTATIC PRESSURE PROCESSING OF FOODS".

BACKGROUND OF THE INVENTION

1. Field of the Invention

This invention relates generally to a pressure indicator, wherein pressure is indicated by a change in density. The pressure indicator is utilized in a method for measuring pressure in a high pressure vessel, one example of which is in high hydrostatic pressure processing.

2. Description of the Prior Art

High Hydrostatic Pressure (HHP) processing has been successfully commercialized by several companies around the world on foods such as hams, fruit juices, jams, guacamole and oysters to reduce the risk of microbial contamination and extend shelf life. Isostatic compression transfers pressure instantly and uniformly throughout the pressure medium providing a non-thermal process alternative for the pasteurization of temperature-sensitive foods. Foods suspended in the pressure medium are assumed to follow the isostatic principle.

The unique design of the HHP equipment restricts access to the interior of the pressure vessel during operation thereby preventing direct measurement of the pressure using standard pressure gauges. No methods have been reported for measuring the pressure within the HHP vessel or within a food product during the HHP process.

Effects of HHP processing on the microbiological, physical and chemical aspects of various food systems have been the topic of much research. The pressure within the HHP vessel is currently measured indirectly by gauges measuring the pressure media or the expansion of the yolk on the HHP unit itself.

Processing powdered ceramics and metals using isostatic high-pressure gas or HHP is an established science. Cold Isostatic Pressing (CIP) of powdered metals was first described by Madden in 1913 in a U.S. patent assigned to the Westinghouse Lamp Co. The process consolidates powdered metal or ceramic into a more dense structure that is near the net shape of the desired finished product through the use of isostatic pressing, similar to packing a snowball. This 'near net shape' is referred to as a 'green body' since it requires further densification and hardening by sintering.

CIP parts are produced using either a wet bag or dry bag process. As the names imply, a wet bag process uses a pressurized liquid medium to compress a powdered material into a solid shape that is protected from the liquid by an elastic mold. The dry bag process uses fixed molds and is pressurized by gases. Pressures typically used to produce CIP products range from 55 MPa for Teflon powders to 400 MPa for iron and stainless steel powders.

Hot Isostatic Pressing (HIP) was developed by the Battelle Memorial Institute in 1956 to bond nuclear fuel elements. HIP'ing is generally performed at pressures lower than 200 MPa at temperatures ranging from 500° C. to 2200° C. using argon or nitrogen gases. Combining high-pressure and high-temperature processes eliminates the sintering step associated with the CIP process.

Hite and Bridgeman pioneered research using HHP processing to inactivate bacteria in milk and denature egg albumin proteins in the late 1800's and early 1900's. HHP processing of foods has been extensively studied during the last century but equipment technology constraints prevented commercialization of the process until the 1990's. Pressures as high as 1000 MPa have been studied but equipment limitations limit the practical operating range between 200 MPa and 600 MPa.

The process is governed by Le Chatelier's principle which states that a system at equilibrium adjusts when subjected to a stress. The principle for using the HHP process as a pasteurization method is based on the assumption that the product also follows the isostatic rule. This rule states that isostatic pressure is instantly and uniformly transmitted throughout the pressurized medium and the enclosed food product, regardless of size, shape or physical state of the food.

The mechanical compression of powders to form tablets for pharmaceuticals, confections and other uses has been studied by a number of authors. The science of powder technology is reviewed quite well by editors Fayed and Otten in the Handbook of Powder Science and Technology, New York, N.Y., Van Nostrand Reinhold Company (1984) and Alderborn and Nystrom in Pharmaceutical Powder Compaction Technology, New York, N.Y., Marcel Dekker, Inc. (1995). Tablets are typically formed by direct compression using a uniaxially oriented force in a punch and die mechanical operation. Table densities are not uniform due to the speed and force of the upper or lower punch, effects of the side-walls of the die, degree of die lubrication and tablet formulation.

The present invention addresses the problems associated with the prior art and provides for an irreversible pressure indicator that may be inserted into a high pressure vessel or food product to determine pressure that was achieved during the process.

SUMMARY OF THE INVENTION

In one embodiment, the invention is a method of measuring pressure inside of a high pressure vessel. The method includes compressing a substance at a first pressure to create a preform having a first density. The preform is placed in a high pressure vessel. The preform is then subjected to a second pressure, greater than the first pressure, thereby changing the preform to a second density, greater than the first density, whereby the second pressure can be determined.

In another embodiment, the invention is a method of monitoring pressure inside of a high pressure vessel during food processing. The method includes placing a food product inside of a high pressure vessel. A preform, having a first density, is placed in the high pressure vessel. The food and the preform are subjected to a high pressure in the vessel, thereby changing the density of the preform, whereby the pressure in the vessel can be determined.

In another embodiment, the invention is a method of measuring pressure inside of a food product, while the food product is subjected to high hydrostatic pressure. The method includes placing a food product inside of a high pressure vessel. A preform, having a first density, is positioned in the food product. Then, the food product and preform are subjected to a high pressure in the vessel, thereby changing the density of the preform, whereby the pressure in the food can be determined.

In another embodiment, the invention is a method of forming a solid shaped body. The method includes compressing a face-centered cubic crystal powder at a first pressure to create a preform. The preform is moved to a high pressure vessel. The preform is then subjected to a second pressure, greater than the first pressure, to increase density of the preform, whereby the second pressure can be determined.

In another embodiment, the invention is a kit for determining pressure in a high pressure vessel. The kit includes a preform formed from a plastic material, wherein density changes at pressures greater than 100 MPa are irreversible. The preform is formed under a first pressure, having a first density. Also included are instructions for placing the preform in a high pressure vessel, wherein the preform has a second density, thereby enabling the second pressure to be determined.

DETAILED DESCRIPTION OF A PREFERRED EMBODIMENT

Figure 1:
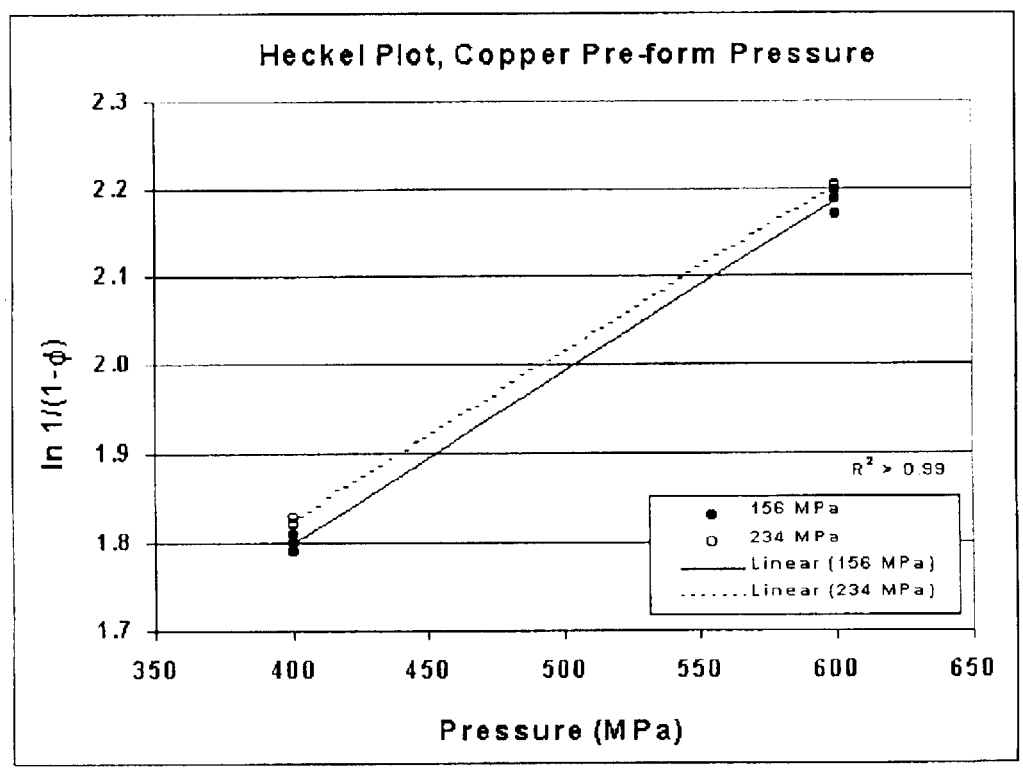
FIG. 1 is a Heckel plot for copper tablets preformed at 156 and 234 MPa and subsequently processed at 400 to 600 MPa.
Figure 2:
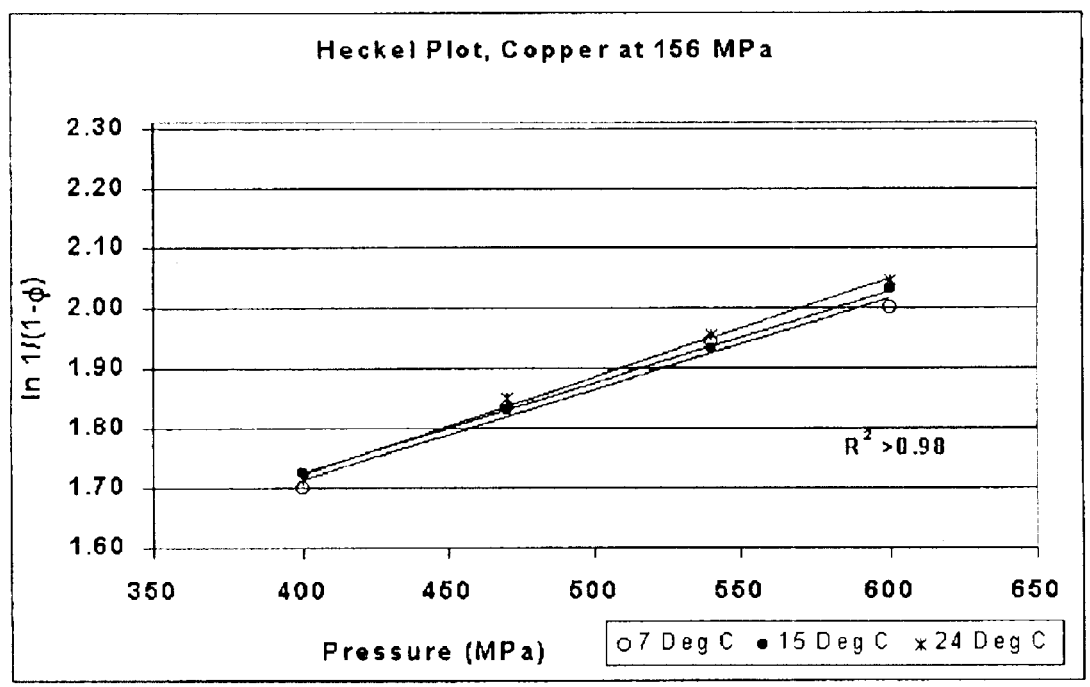
FIG. 2 is a Heckel plot for copper tablets preformed at 156 MPa and subsequently HHP processed at three different temperatures between 400–600 MPa.

In this application, the Heckel equation was used to transform the density data to linearize the data points to permit statistical comparison. The Heckel equation is as follows:

$$H = \ln\left(\frac{1}{1-\phi}\right)$$

φ=relative density $$\left(\frac{\rho_0}{\rho_{abs}}\right)$$

in g/cm$^3$ $\rho_0$=apparent density $\rho_{abs}$=true or absolute density (8.96 g/cm$^3$ for copper)

Preforms or tablets were made using the following procedures:

1. Chem Copp 1000, lot 876 (American Chemet Corp., East Helena, Mont.) powered copper was used for the balance of this research. The copper was dried overnight at 60° C. and stored several weeks at room temperature in a Nalgene® plastic desiccator (Nagle Nune Int., Rochester, N.Y.) using Drierite® anhydrous calcium sulfate (W.A. Hammond Drierite Co., Ltd., Xenia, Ohio) to maintain a dry environment. The copper was stored under these conditions until compressed into tablets.

2. A standardized operating procedure was developed to produce tablets using the manual Carver press (Model 4350L, Carver Inc., Wabash, Ind.). The powder was uniformly distributed in the bottom of the die set and the manual press was brought into contact with the top punch. The press was then pumped one full stroke and pumped again until a force of approximately 10,000 psi was attained. This equates to 156 MPa when producing tablets ¾ inch in diameter. The pressure was immediately released from the press and the tablet removed from the die. Total compression time from the start of the first full stroke until the completion of the second 'at pressure' stroke was less than 5 seconds. The punch and die set was swabbed with a solution of 1% magnesium stearate in ethanol using a small nylon test tube brush before compressing each tablet (Pfaltz and Bauer, Inc., Waterbury, Conn. and Aaper Alcohol & Chem. Co., Shelvyville, Ky.).

3. Approximately 4.5 grams of powdered Chem Copp 1000 (lot CP-876) copper were uniaxially compressed at 156 MPa pressure into ¾ inch diameter tablets, although it is understood other pressures or preforms of different size and shape may be used.

4. Tablets were produced using a ¾ inch diameter (19.05 mm) hardened steel die.

5. A 1% magnesium stearate in ethanol solution was brushed on the surfaces of the punch and die between tablet compressions for lubrication.

6. Indicator tablets were placed individually in the 4-mil polypropylene 35-mm slide archive sheet pockets trimmed to eliminate excess film and then individually vacuum-sealed prior to HHP processing.

7. HHP process water temperature was held constant at 15° C. (±1.0° C.) (except for the study testing the effect of water temperature).

8. Adiabatic heating and cooling was allowed to proceed normally during the process.

9. Density of the preforms were determined. Tablets were weighed to ±0.0001 grams using a Mettler balance (Model AEZ40, Mettler Instrument Co., Highstown, N.J.). The volume of each tablet was determined by averaging six different diameter and thicknesses measurements to ±0.001 mm using a hand-held micrometer (Mitutoyo digital #293, Mituoyo Inc., Japan). Density was calculated by dividing the volume by the weight to ±0.001 g/cm$^3$.

10. Density data was transformed for analysis using the Heckel equation.

The HHP equipment will be described hereafter, it being understood that the present invention may be used with any high pressure vessel.

The 35-liter capacity HHP was not operated isothermally during this study. Instead, the water and vessel temperatures heated and cooled adiabatically with the change in pressure. As pressure increased, the water temperature increased while at the same time, the vessel temperature remained fairly constant. As the temperature difference increased between the vessel and the pressurized water, the adiabatically heated water was cooled by the lower temperature vessel, resulting in a pressure drop inside the vessel. Once the pressure dropped approximately 0.75% below the target pressure, the pressure booster pumps automatically engaged to maintain pressure at the targeted level. Hence, the vessel never reached constant equilibrium pressure conditions during the HHP process but instead required one to four pressure boosts between 8–10 MPa to maintain the pressure within the targeted operating range for the duration of the process.

This is in contrast to much of the research reported in the literature conducted with the use of 1 to 2-liter capacity research type HHP units. With these units, the vessels are small enough to easily control the water and vessel temperatures under isothermal conditions. This is very difficult to control in larger, commercial vessels with operating capacities over 200 liters, so no attempt was made to control the process for the indicator during its development.

The reported process times during this study do not include the time to fill, pressurize or depressurize the vessel, but only account for the time 'at pressure'. The time to fill the vessel depends on the amount of volume occupied by product. An empty vessel takes approximately 55 seconds to fill with water while a vessel full of product only takes approximately 40 seconds to fill. The fill time is relatively unimportant as this only accounts for the time to quickly pump the vessel full of water before the pressurization process begins. For this reason, the time to fill the vessel was not reported.

The time to pressurize the vessel for each test took between 77–113 seconds, depending on the target pressure, with the longer times associated with the higher target pressures.

The time to depressurize the unit ranged from 30–35 seconds depending on the target pressure, with the longer time associated with the highest target pressure. Once the established process time is reached, the decompression valve automatically opens to release pressure with the greatest drop in pressure occurring in the first 10-seconds at all pressures.

Once the preforms are made, it is necessary to prepare a standard curve so that changes of density may be equated to a given pressure. Since the Heckel equation linearizes the data, it is necessary to verify the end points. Two standardized curves were then produced for pressures between 400 to 600 MPa. The results are shown in FIG. 1. Several data points were taken for preforms formed at 156 MPa and other preforms formed at 234 MPa. The preforms were placed in the HPP and subjected to either 400 or 600 MPa. Using the equations previously disclosed, the Heckel number was calculated based on the density of the preforms after being subjected to the pressure. For the purpose of this study, it was assumed that the pressure inside of the vessel was the same as the pressure readings recorded at the discharge of the high pressure pumps. The slopes of the two lines are equal indicating that the increase in density is due to the HHP processing resulting in the compression of the preform/indicators in a similar fashion. The shift in regression lines indicated by the different intercepts is the result of different pre-form pressures. A Heckel plot regression analysis for copper indicators compressed at 156 and 234 MPa is as follows:

TABLE 1

Heckel Plot regression analysis for copper indicators compressed at 156 and 234 MPa ($p < 0.002$).

| Pre-form pressure (MPa) | $R^2$ | Line Equation | Se | Significance |
|---|---|---|---|---|
| 156 | >0.99 | Y = 0.00191x + 1.036 | $0.009 \cdot \ln\left(\frac{1}{1-\phi}\right)$ | a |
| 234 | >0.99 | Y = 0.00191x + 1.056 | $0.009 \cdot \ln\left(\frac{1}{1-\phi}\right)$ | b |

Having now determined the relationship between density and pressure for a given preform, the preform or indicators are now able to be used to verify the pressure that is inside of a high pressure vessel. It is no longer necessary to rely on the gauges that are external to the vessel. A preform or indicator is placed inside of the vessel during processing of a food product. The density of the preform is then calculated after the food has been subjected to the high pressure and their densities calculated. Then, there will be independent verification that the pressure did in fact exist in the high pressure vessel. Prior to this time, it was necessary to rely on the external gauges as to the actual pressure inside of the vessel.

It is noted that tablets produced for these studies were formed on an individual basis. Tablets formed for one study were produced on different days than tablets formed for other studies. The variation in Heckel values between studies (as seen in FIGS. 1–4) represent the importance of running controls for each test to establish the standard curve. Tablets formed on a commercial scale would dramatically reduce this day-to-day variation and eliminate the need to establish a standard curve for each study.

While the preform has been described as having a certain configuration and shape, it is understood that other suitable sizes and shapes could be utilized. Further, other methods of determining density may also be utilized and still be within the scope of this invention.

A test was also conducted on copper tablet preforms that were pre-formed at 156 MPa and then processed between 400 to 600 MPa at different temperatures. The Heckel equation was applied to evaluate the data using linear regression analysis. The analysis is summarized in Table 2 below and is plotted in FIG. 2.

TABLE 2

Heckel Plot regression analysis for copper tablets compressed at 156 MPa ($p < 0.029$).

| Temperature | $R^2$ | Line Equation | Se | Significance |
|---|---|---|---|---|
| 7° C. | >0.98 | Y = 0.0015x + 1.1048 | $0.016 \cdot \ln\left(\frac{1}{1-\phi}\right)$ | a |
| 15° C. | >0.99 | Y = .0015x + 1.1164 | $0.016 \cdot \ln\left(\frac{1}{1-\phi}\right)$ | a |
| 24° C. | >0.99 | Y = .0016x + 1.0656 | $0.016 \cdot \ln\left(\frac{1}{1-\phi}\right)$ | a |

No significant difference was observed in the increase in density of the tablets between 400–600 MPa between the three temperatures studied. This indicates that the temperatures between 7° C. and 24° C., the likely temperatures for processing food, will not have a significant effect on the predicted pressure due to a change in tablet density.

Figure 3:
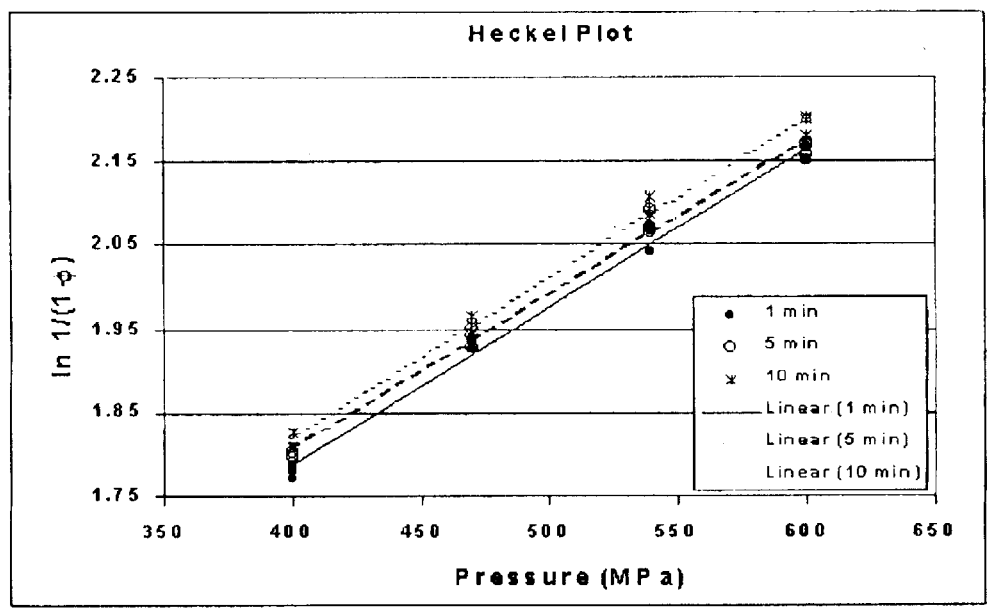
FIG. 3 is a Heckel plot for copper preforms HHP processed between 400 to 600 MPa for 1, 5 or 10 minutes.

It has also been determined that the time at which the second pressure is available to increase the density of the preform is significant. Attached as FIG. 3 is a plot of the indicators that were processed in the HHP equipment at 1, 5 and 10 minutes at between 400 to 600 MPa. It can therefore be seen that the amount of time in the high pressure vessel does effect the change in density. Accordingly, this must be taken into account also when making a standardized curve. The standardized curve should be for an indicator made at a certain pressure as well as indicators that are exposed to a second pressure for a given length of time.

As previously discussed, prior art has always assumed that the products being processed by HHP follow the isostatic rule. The present invention allows for the testing of that assumption. This is critical in the processing of food as it is necessary that certain pressures be reached in order to process the food properly. The prior art has assumed that the pressure has been equal throughout the food product being processed. With the present preform indicators, it is possible to place the preform indicators inside of the food product and determine the actual pressure that a particular portion of the food product experiences.

Twelve-half hams (Ham) (Cure-81® Hams, Hormel Foods Corp.) weighing between 1400–1800 grams and twelve-half dry-cure hams (DC Ham) (Parma™ Proscuitto, Hormel Foods Corp.) weighing between 1600–2200 grams were selected for HHP processing. The moisture content of the Hams ranged between 73–74% while the moisture content for the DC Hams ranged between 61–64% (moisture data obtained from the manufacturing facility). All of the hams were prepared by slitting the face to provide access to the center of each ham. Individually packed indicators were placed at the approximate geometric center of each ham and hermetically vacuum-sealed in a 1.8-mil moisture-barrier bag (Cryovac B2541T, Sealed Air Corp., Duncan S.C.) prior to HHP processing. Control indicators were individually sealed and processed in the HHP water along with the test hams. All of the tests were run at pressure for 10 minutes. The two types of hams were tested to observe any effects due to the moisture content of the product.

The regression analysis of the Heckel Plots for the three line equations is listed in Table 3. The $R^2$ values are >0.99 with the regression models having parallel slopes with different intercepts. The density of the indicators at the centers of the two types of hams were significantly different ($p<0.012$) from the control indicators processed in the HHP water outside the hams as shown in Table 3. No significant difference between the two types of hams was observed ($p>0.81$).

TABLE 3

Regression analysis of the Heckel Plots for indicators processed at HHP between 400–600 MPa.

| Variable | $R^2$ | Line Equation | Se |
|---|---|---|---|
| Control | >0.99 | Y = 0.00191x + 1.0534 | $0.0145 \cdot \ln\left(\frac{1}{1-\phi}\right)$ |
| Ham | >0.99 | Y = 0.00191x + 1.0371 | $0.0145 \cdot \ln\left(\frac{1}{1-\phi}\right)$ |
| DC Ham | >0.99 | Y = 0.00191x + 1.0385 | $0.0145 \cdot \ln\left(\frac{1}{1-\phi}\right)$ |

TABLE 4

P-values comparing the regressions of the indicators HHP processed in the Hams against the controls are shown in Table 4.

| Variable | Significance (p-value) |
|---|---|
| Control vs. Ham | 0.0096 |
| Control vs. DC Ham | 0.0171 |
| Ham vs. DC Ham | 0.8128 |

Figure 4:
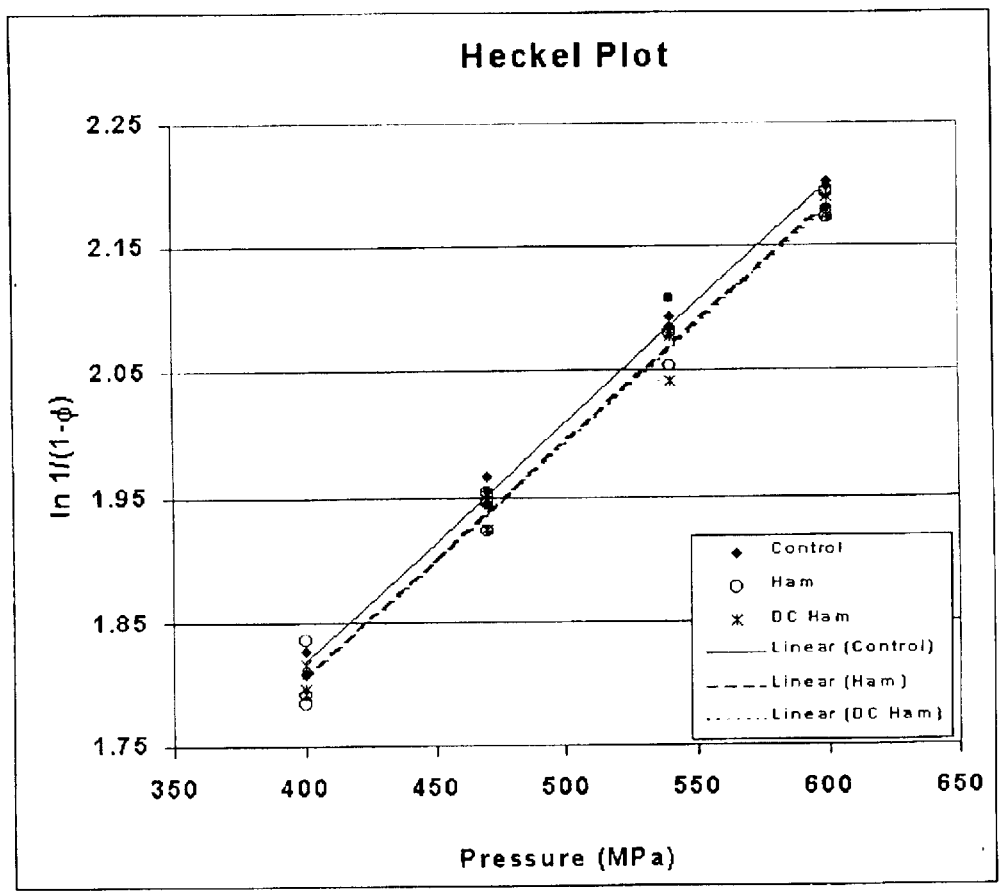
FIG. 4 is a Heckel plot comparing indicators HHP processed between 400–600 MPa (located in the pressure medium (control) and at the center of two types of ham (ham and DC ham)

The Heckel Plot in FIG. 4 shows the increase in density for the indicators processed in the two types of hams vs. the control indicators at pressures between 400–600 MPa. The regression lines for the two hams are superimposed on each other as dashed lines since their linear equations are nearly identical.

Linear regression models suggest that on the average, an indicator positioned within either of the two hams experienced approximately 9 MPa less pressure than the indicators processed in the HHP water. The present form of the indicator has a statistical confidence interval of ±16 MPa for a single point measurement. The 9 MPa difference between the control and ham indicators is smaller than the confidence interval around the estimated density at any selected pressure. In simpler terms, the significant difference identified between the control and ham indicators (9 MPa) cannot be discriminated when predicting a single point estimate with a wider confidence interval using the current hand-made indicators.

This does not de-emphasize the fact that a significant difference exists between the pressure delivered by the HHP vessel versus the pressure experienced within the hams. It simply points out that the amount of variation occurring during the production of the preforms and measuring the post HHP density for an individual indicator is greater than the pressure differences between the variables. The difference of 9 MPa equates to approximately 2.25 percent less pressure at 400 MPa and 1.5 percent less pressure at 600 MPa within the hams suggesting that the isostatic rule does not apply to hams and possibly other food products. No significant difference was observed between the hams suggesting that the moisture content is not a critical factor influencing pressure transmission throughout the food product.

The powder or substance that is used is preferably copper. Elastic, plastic and brittle properties are influenced by the crystal structure of the particles under compression. By plastic, it is meant that the particle compaction is irreversible. Nearly ideal plastic materials, such as silver, gold, copper, iron, nickel and aluminum, have a particular lattice structure called the face-centered cube (FCC). Other face-centered cube structures include austenite, platinum and thorium. Further, it has been found that different sized particles of the same material have been found to produce compacts of high strength and density. Therefore, a blend of different size powdered copper particles improves compression properties and appears to be the best powdered substance for use with the present pressure indicator. One particular example of a preferred copper is Chem Copp 1000 copper. Here, the composition of that copper includes thirteen percent having a particle size of from 100 $\mu$m to 75 $\mu$m. Forty-one percent is between 75 $\mu$m and 45 $\mu$m and finally forty-six percent is less than 45 $\mu$m.

It can be seen that the preform or pressure indicator is particular to certain conditions. The most important conditions being first, the pressure at which the preform is made and second, the duration that the preform is in the high pressure vessel. Therefore, a standardized curve is ideally made for each situation. That is, the preform is initially made at one pressure, resulting in a first density, and then subjected to what is assumed to be a given pressure in the high pressure vessel, for a given period of time. The density of the preform is then again calculated by any suitable means such as taking multiple dimensional readings of the preform and its weight to determine its density. Then the appropriate Heckel plots are made to derive a standardized curve for a given preform. This preform is then suitable for use with instructions which set forth the pressure at which the preforms were made, and a standardized curve, which was developed for the preforms being in the vessel for a given time. Then, the instructions would point out that the preform should stay in the pressure vessel for that same given time and the density of the preform determined. Then using the standardized curve provided with the instructions, the corresponding pressure that the preform was subjected to can be determined.

It is understood that while the pressures discussed have been 156 and 234 MPa for forming the preform. Other pressures, either lower or higher, may also be utilized. It is preferred that the pressure under which the preform is formed is at least 25 MPa and the pressure that the preform is subjected to be at least 100 MPa. As previously indicated, the practical operating limits of the pressure vessel in the HHP processing of foods is between 200 to 600 MPa and as high as 1,000 and the preferred range is between 400 and 600 MPa.

Figure 5:
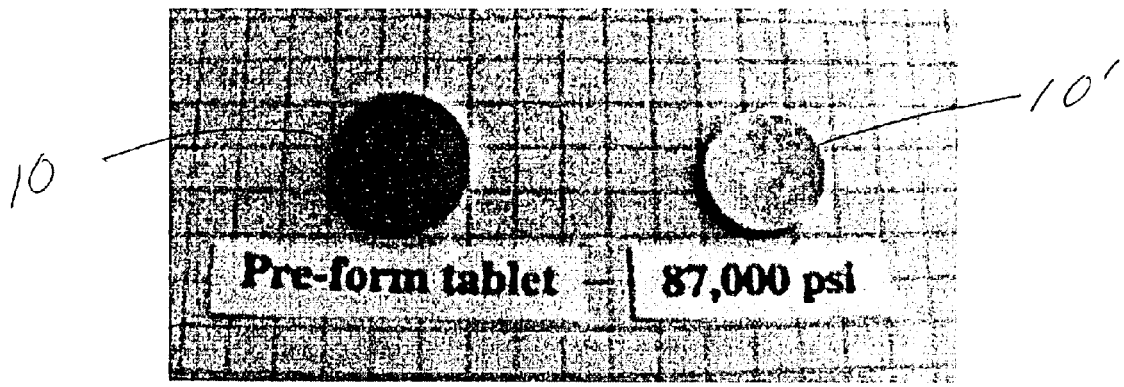
FIG. 5 compares a copper tablet preformed at 156 MPa pressure before and after HHP processing for 10 minutes at 87,000 psi (600 MPa).

FIG. 5 shows the preform/tablet/indicator 10 at a first density 10 after it has been formed at 156 MPa pressure and the preform 10' after HHP processing for 10 minutes at a 7,000 psi (600 MPa). The grid on which the preforms 10 and 10' are sitting are ¼ inch grids. It can therefore be seen that the preform 10 is approximately ¾ inch diameter (19.05 mm), as previously described. The diameter of the preform 10' after HHP processing is approximately $11/16$ inch diameter (17.5 mm) and has a higher density. Also, the thickness of the preform 10 is approximately 0.110 inches (2.8 mm) and the thickness of the preform 10' is approximately 0.098 inches (2.5 mm). However, it is understood that these are approximate dimensions and the actual densities are calculated after taking multiple readings.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of measuring pressure inside of a high pressure vessel, comprising:
    a) compressing a substance at a first pressure to create a preform having a first density;
    b) placing the preform in the high pressure vessel; and
    c) subjecting the preform to a second pressure in the high pressure vessel, greater than the first pressure, thereby changing the preform to a second density, greater than the first density, whereby the second pressure can be determined by measuring a change in density of the preform.

2. The method of claim 1, wherein the substance is plastic so that density change is irreversible.

3. The method of claim 1, wherein the preform has a face-centered cubic structure.

4. A method of monitoring pressure inside of a high pressure vessel during food processing, comprising:
    a) placing a food product inside of a high pressure vessel;
    b) placing a preform, having a first density, in the high pressure vessel; and
    c) subjecting the food product and preform to a high pressure in the vessel, thereby changing the density of the preform, whereby the pressure in the vessel can be determined by measuring the change in the density of the preform.

5. The method of claim 4, further comprising placing the preform in the food product, wherein pressure inside of the food product can be determined.

6. The method of claim 4, wherein the preform is of a material that is plastic so that density change is irreversible.

7. The method of claim 4, the preform has a face-centered cubic structure.

8. A method of measuring pressure inside of a food product, while the food product is subjected to high hydrostatic pressure, comprising:
    a) placing a food product inside of a high pressure vessel;
    b) placing a preform, having a first density, in the food product; and
    c) subjecting the food product and preform to a high pressure in the vessel, thereby changing the density of the preform, whereby the pressure in the food can be determined by measuring the change in the density of the preform.

9. The method of claim 8, wherein the high pressure is greater than 100 MPa.

10. The method of claim 9, wherein the high pressure is from 400 MPa to 600 MPa.

11. The method of claim 8, wherein the preform is of a material that has a face-centered cubic crystal structure.

12. The method of claim 8, wherein the preform is a powder selected from the group consisting of copper, gold, silver, platinum austenite and thorium.

13. The method of claim 8, wherein the preform is of a material that is a powder selected from the group consisting of copper, gold, silver and platinum.

14. The method of claim 8, wherein the preform is of a material that is copper.

15. The method of claim 12, wherein the preform is of a material that has a non-uniform size.

16. The method of claim 12, wherein density change is irreversible.

* * * * *

UNITED STATES PATENT AND TRADEMARK OFFICE
CERTIFICATE OF CORRECTION

PATENT NO. : 6,799,467 B2
DATED : October 5, 2004
INVENTOR(S) : Minerich et al.

It is certified that error appears in the above-identified patent and that said Letters Patent is hereby corrected as shown below:

Title page,
Item [75], Inventors, delete "B." and insert therefore -- E. --

Column 3,
Lines 44-50, delete the broken-up equation:
"φ = relative density $\left(\dfrac{\rho_0}{\rho_{abs}}\right)$ in g/cm³" and insert therefore -- φ = relative density $\left(\dfrac{\rho_0}{\rho_{abs}}\right)$ in g/cm³ --

Column 10,
Line 33, delete "claim 8" and insert therefore -- claim 11 --

Signed and Sealed this

Seventeenth Day of May, 2005

JON W. DUDAS
*Director of the United States Patent and Trademark Office*